(12) United States Patent
Akashi et al.

(10) Patent No.: US 7,872,769 B2
(45) Date of Patent: Jan. 18, 2011

(54) DIVIDED JOB SCHEDULER

(75) Inventors: Masamichi Akashi, Chiba-ken (JP); Yukihiko Shimizu, Chiba-ken (JP); Masataka Yasuda, Kanagawa-ken (JP); Noriyuki Kobayashi, Kanagawa-ken (JP); Shinichiro Maekawa, Kanagawa-ken (JP); Takeshi Namikata, Kanagawa-ken (JP); Hideki Sakai, Chiba-ken (JP); Hirohiko Tashiro, Kanagawa-ken (JP); Atsushi Matsumoto, Tokyo (JP); Yushi Matsukubo, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1004 days.

(21) Appl. No.: 11/148,257

(22) Filed: Jun. 9, 2005

(65) Prior Publication Data
US 2005/0275881 A1 Dec. 15, 2005

(30) Foreign Application Priority Data
Jun. 9, 2004 (JP) .............................. 2004-171768

(51) Int. Cl.
G06F 3/12 (2006.01)
(52) U.S. Cl. ....................... 358/1.15; 358/1.14; 718/102
(58) Field of Classification Search ................. 358/1.13, 358/1.14, 1.15, 400, 434; 718/102
See application file for complete search history.

(56) References Cited

U.S. PATENT DOCUMENTS

| | | | | |
|---|---|---|---|---|
| 4,876,606 | A * | 10/1989 | Banno et al. ................. | 358/434 |
| 6,188,487 | B1 * | 2/2001 | Matsubara ................. | 358/1.15 |
| 6,549,947 | B1 * | 4/2003 | Suzuki ........................ | 358/1.15 |
| 7,073,174 | B2 * | 7/2006 | Volkoff et al. .............. | 718/102 |
| 7,081,969 | B1 * | 7/2006 | Motamed et al. ........... | 358/1.15 |
| 7,256,901 | B2 * | 8/2007 | Ferlitsch .................... | 358/1.15 |
| 2002/0023046 | A1 * | 2/2002 | Callahan et al. ............... | 705/37 |
| 2002/0113989 | A1 * | 8/2002 | Ferlitsch et al. ............ | 358/1.15 |
| 2002/0128001 | A1 | 9/2002 | Shuttleworth | |
| 2002/0138558 | A1 * | 9/2002 | Ferlitsch ..................... | 358/400 |
| 2003/0007177 | A1 * | 1/2003 | Ferlitsch .................... | 358/1.15 |
| 2003/0117638 | A1 * | 6/2003 | Ferlitsch .................... | 358/1.13 |

(Continued)

FOREIGN PATENT DOCUMENTS

JP    8044678    2/1996

(Continued)

OTHER PUBLICATIONS

Office Action, dated Nov. 9, 2007, in JP 2004171768.

(Continued)

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

In a computer system including a job scheduler which divides an input job and determines a client apparatus to assign the divided job, and a task manager which transmits the divided job to the client apparatus determined by the job scheduler, the job scheduler assigns the same job to a plurality of client apparatuses when the number of client apparatuses is larger than the number of divided jobs, and when the job is finished in one of the plurality of client apparatuses assigned the same job, execution of the job in the remaining client apparatuses is canceled so that the time until all jobs are finished is shortened.

19 Claims, 10 Drawing Sheets

U.S. PATENT DOCUMENTS

| | | | |
|---|---|---|---|
| 2004/0061909 A1* | 4/2004 | Ferlitsch et al. | 358/1.15 |
| 2004/0179225 A1* | 9/2004 | Hopp | 358/1.13 |
| 2004/0190042 A1* | 9/2004 | Ferlitsch et al. | 358/1.15 |
| 2005/0068562 A1* | 3/2005 | Ferlitsch | 358/1.14 |
| 2005/0099649 A1* | 5/2005 | Ferlitsch et al. | 358/1.15 |
| 2009/0244620 A1* | 10/2009 | Takahashi et al. | 358/1.15 |

FOREIGN PATENT DOCUMENTS

| | | | |
|---|---|---|---|
| JP | 1115802 | | 1/1999 |
| JP | 11015802 A | * | 1/1999 |
| JP | 11134144 | | 5/1999 |
| JP | 11175485 | | 7/1999 |
| JP | 2001034428 | | 2/2001 |
| JP | 2001236336 | | 8/2001 |
| JP | 2002128001 | | 5/2002 |
| JP | 2002358291 | | 12/2002 |

OTHER PUBLICATIONS

Office Action dated Jul. 17, 2007 of JP 2004-171768.
U.S. Appl. No. 11/148,264, filed Jun. 9, 2005.
U.S. Appl. No. 11/148,268, filed Jun. 9, 2005.
U.S. Appl. No. 11/148,286, filed Jun. 9, 2005.
U.S. Appl. No. 11/148,269, filed Jun. 9, 2005.
U.S. Appl. No. 11/148,298, filed Jun. 9, 2005.
U.S. Appl. No. 11/197,511, filed Aug. 5, 2005.

* cited by examiner

DIVIDED JOB SCHEDULER

FIELD OF THE INVENTION

The present invention relates to a computer system and a job assignment method in the system and, more particularly, to a job assignment method when grid computing is applied to a computer system in which a host computer and a plurality of client apparatuses are connected to each other through a network.

BACKGROUND OF THE INVENTION

In recent years, grid computing (to be also simply referred to as "grid" hereinafter) has received a great deal of attention, which makes a plurality of computers connected through a network available as if they were a single system. Attempts to apply it to various fields have been made.

FIG. 1 is a block diagram for explaining the architecture of grid computing. There exist several kinds of grids. One called a desktop grid will be explained here, which executes a job by using the vacant time of the CPU of, e.g., a desktop PC.

Referring to FIG. 1, a client 10 is a device to which a user inputs a job as a request. The input job is transferred to a task manager (to be abbreviated as TM hereinafter) 20. The TM 20 transmits the contents of the job to a dynamic job scheduler (to be abbreviated as DJS hereinafter) 30.

The DJS 30 manages the resources of all of a plurality of host devices 41 to 43 each of which includes a broker 411 and resource manager (to be abbreviated as RM hereinafter) 412 and is recognized as a resource. The DJS 30 analyzes the job, selects the broker 411 of an optimum resource, and notifies the TM 20 of it. "Resource" means the vacant state of an available CPU.

The broker 411 registers, in the DJS 30, resource information acquired by the RM 412 and inputs the job to an optimum resource in accordance with the request from the TM 20. When the job is finished, the broker 411 notifies the TM 20 of the completion of the job.

The TM 20 inputs the job to the optimum broker 411 selected by the DJS 30 and monitors the state of progress of the job. Upon receiving the completion notification from the broker 411, the TM 20 notifies the client 10 of the result. When a change or error (e.g., a failure or reception of another job) has occurred in the resource, the RM 412 notifies the broker 411 of it.

With this mechanism, a job is distributed to a resource such as a CPU which is normally unused so that distributed processing can be executed by a plurality of devices without making the user conscious. Hence, desktop grid computing is implemented.

Scientific research has extensively been done for implementing high-speed processing by collecting the CPU powers of computers using the above-described grid computing technologies. However, application of grid computing to an incorporated device such as MFP (Multi Function Peripheral) called a multifunction apparatus or SFP (Single Function Peripheral) has not been implemented yet.

For example, when this technology is applied to an image forming system including MFP connected to an office LAN, PCs, server, and MFP on the LAN are used as resources to be subjected to distributed processing.

When a job is divided and distributed in this arrangement, the job cannot finish until the distributed processes in all devices are finished. If the user of the terminal of a client requests another job processing (local job processing), this processing is preferentially done. Since the above-described distributed job can be stopped any time at the discretion of each client, processing takes a longer time after all.

SUMMARY OF THE INVENTION

It is an object of the present invention to shorten the total processing time when divided jobs are distributed to a plurality of clients.

In order to achieve the above object, according to an aspect of the present invention, there is provided a job assignment method in a computer system including a job scheduler which divides an input job and determines a client apparatus to assign the divided job, and a task manager which transmits the divided job to the client apparatus determined by the job scheduler, comprising causing the job scheduler to assign the same job to a plurality of client apparatuses when the number of client apparatuses is larger than the number of divided jobs, and when the job is finished in one of the plurality of client apparatuses assigned the same job, canceling execution of the job in the remaining client apparatuses.

That is, according to the present invention, in a computer system including a job scheduler which divides an input job and determines a client apparatus to assign the divided job, and a task manager which transmits the divided job to the client apparatus determined by the job scheduler, the job scheduler assigns the same job to a plurality of client apparatuses when the number of client apparatuses is larger than the number of divided jobs, and when the job is finished in one of the plurality of client apparatuses assigned the same job, execution of the job in the remaining client apparatuses is canceled.

When the number of client apparatuses is larger than the number of divided jobs, the processing time of each divided job is that in the client apparatus which has finished the processing at the earliest timing.

Hence, the time until all jobs are finished can be shortened.

The job scheduler may divide the plurality of client apparatuses into a plurality of groups and determine the client apparatus to assign the divided job for each group.

The canceling step may comprise a detection step of detecting whether all the divided jobs are finished in each group, and when it is detected in the detection step that all the divided jobs are finished in a group, execution of the job in the remaining groups is forcibly canceled.

The job scheduler may assign in turn the divided jobs to, of the plurality of client apparatuses, all client apparatuses capable of receiving the job.

The job scheduler may comprise storage means for storing information about each client apparatus and determine an assignment order of the divided jobs on the basis of the information stored in the storage means.

In this case, the information may contain one of information about performance of a resource of the client apparatus and information about an execution result of a job in the client apparatus.

The present invention can be applied to an image forming system in which an apparatus including the job scheduler and the task manager or at least one of the client apparatuses is an image forming apparatus.

The above object can also be achieved by an information processing apparatus capable of operating as the host computer of the computer system, a computer system including a host computer and client apparatuses, a computer program which causes a computer apparatus to execute the job assignment method, and a storage medium which stores the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that each element in the following embodiments is not intended to limit the scope of the invention, but is described only as an example.

(Basic Arrangement)

The basic arrangement of an image forming system according to the present invention, which is common to the following embodiments, will be described first.

Figure 1:
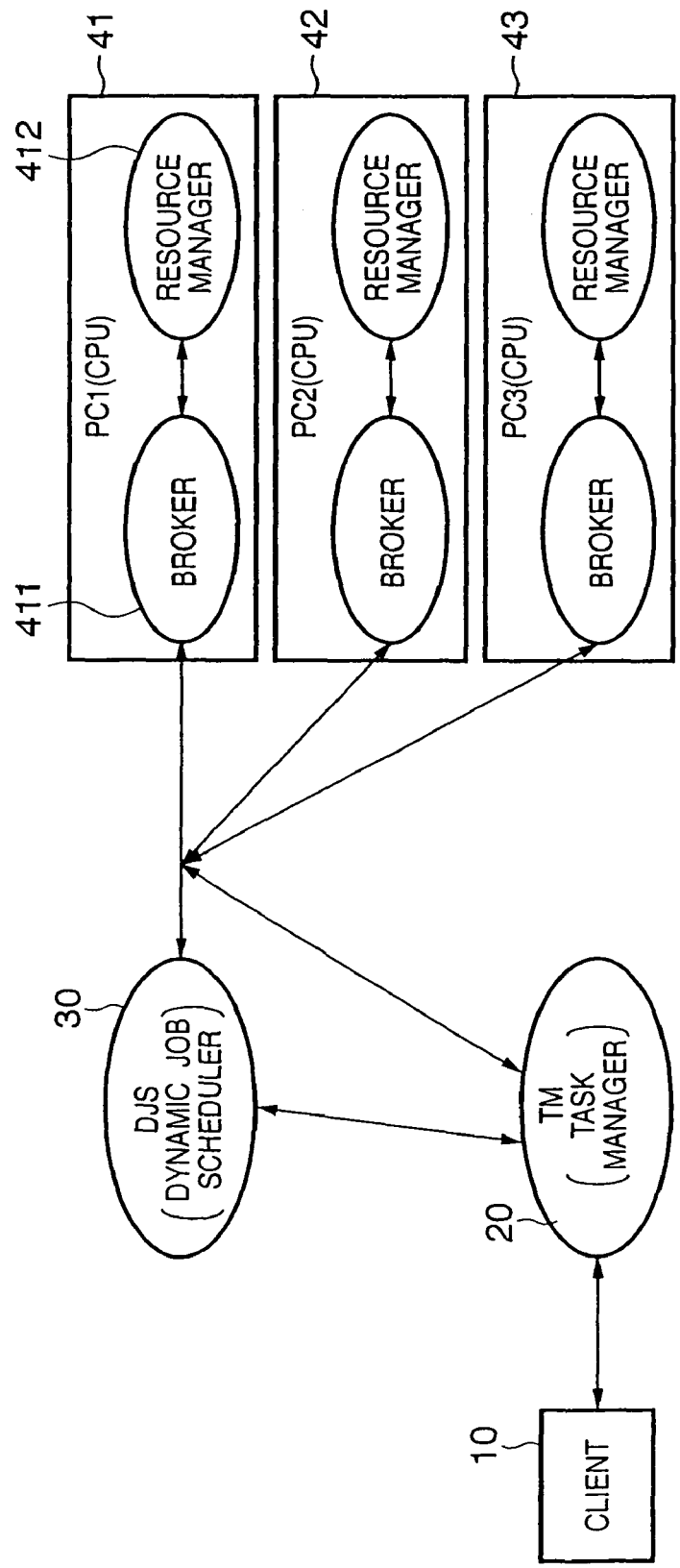
FIG. 1 is a block diagram showing the basic arrangement of grid computing.
Figure 2:
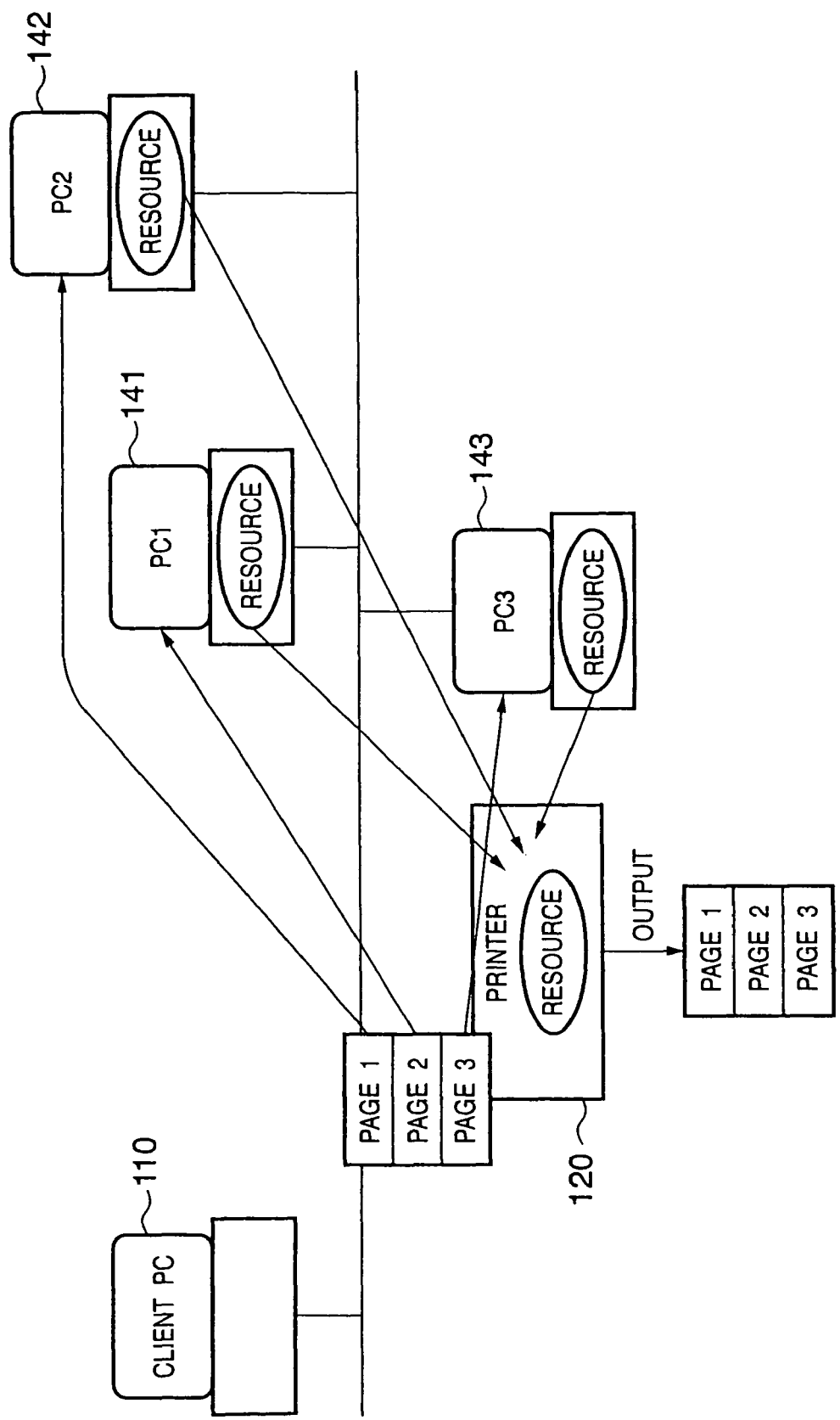
FIG. 2 is a block diagram showing the basic arrangement of an image forming system according to the present invention.

FIG. 2 is a block diagram showing the basic arrangement of the image forming system according to the present invention, in which grid computing is applied to PDL processing (rendering processing of a page description language to a raster image) of a printer. In the arrangement shown in FIG. 1, the modules included in the grid are handled as separate devices. However, when the system is applied to an image forming apparatus such as MFP or printer, generally, a plurality of modules are present in one device.

In the arrangement shown in FIG. 2, the user inputs a job such as a print instruction from a client PC 110. The input job is analyzed by an image forming apparatus 120 such as a printer having TM and DJS functions. Distributed processing by grid computing is executed by using the resources of three PCs, i.e., PC 1 (141), PC 2 (142), and PC 3 (143) each having a broker and RM.

In the arrangement shown in FIG. 2, the image forming apparatus 120 also has the function of the host in grid computing. A PC except the image forming apparatus 120 may have the function of the host, as a matter of course.

When the print job of PDL is input from the client PC 110, the job is appropriately distributed to the resources of the PCs 141 to 143 through the TM and DJS of the image forming apparatus 120. At this time, the application program for image rendering processing of PDL is also simultaneously transmitted from the image forming apparatus 120 to each PC.

Images which are formed by causing the respective PCs to render PDL are collected by the image forming apparatus 120 and finally output in the collected state.

The number of clients (resources) to be subjected to distributed processing is not particularly limited. Three or more clients may be used. The resource of the client PC 110 to which the job is input or the resource of the image forming apparatus 120 may be subjected to distributed processing.

First Embodiment (Hardware Configuration of Image Forming Apparatus)

Figure 3:
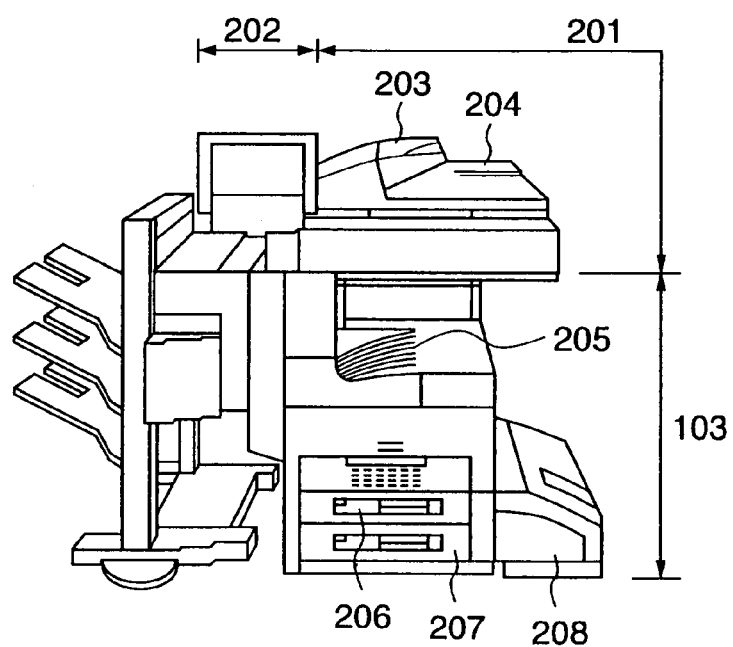
FIG. 3 is a view showing the outer appearance of an image forming apparatus.

FIG. 3 is a view showing the outer appearance of an image forming apparatus having a copy function according to the first embodiment. A scanner 201 serving as an image input device illuminates an image on a paper sheet as a document and scans a CCD line sensor (not shown) to generate raster image data.

The user sets document paper sheets on a tray 203 of a document feeder 204 and inputs a reading operation start instruction from an operation unit 202. The controller CPU of the image forming apparatus gives an instruction to the scanner 201. The feeder 204 feeds the document paper sheets one by one. The scanner 201 reads the document images.

The operation unit 202 serves as a user interface to do setting instruction or status display in the copy operation or designate various kinds of operation settings.

A printer engine 103 serving as an image output device prints the raster image data on paper sheets. The printer engine 103 can employ any scheme such as the electrophotography scheme using a photosensitive drum or photosensitive belt or the inkjet scheme to print an image on a paper sheet directly by discharging ink from a micro nozzle array. The print operation is activated by an instruction from the controller CPU.

The printer engine 103 has a plurality of paper feed stages to select different paper sizes or different paper orientations and comprises corresponding paper sheet cassettes 206, 207, and 208. A discharge tray 205 receives printed paper sheets.

Figure 4:
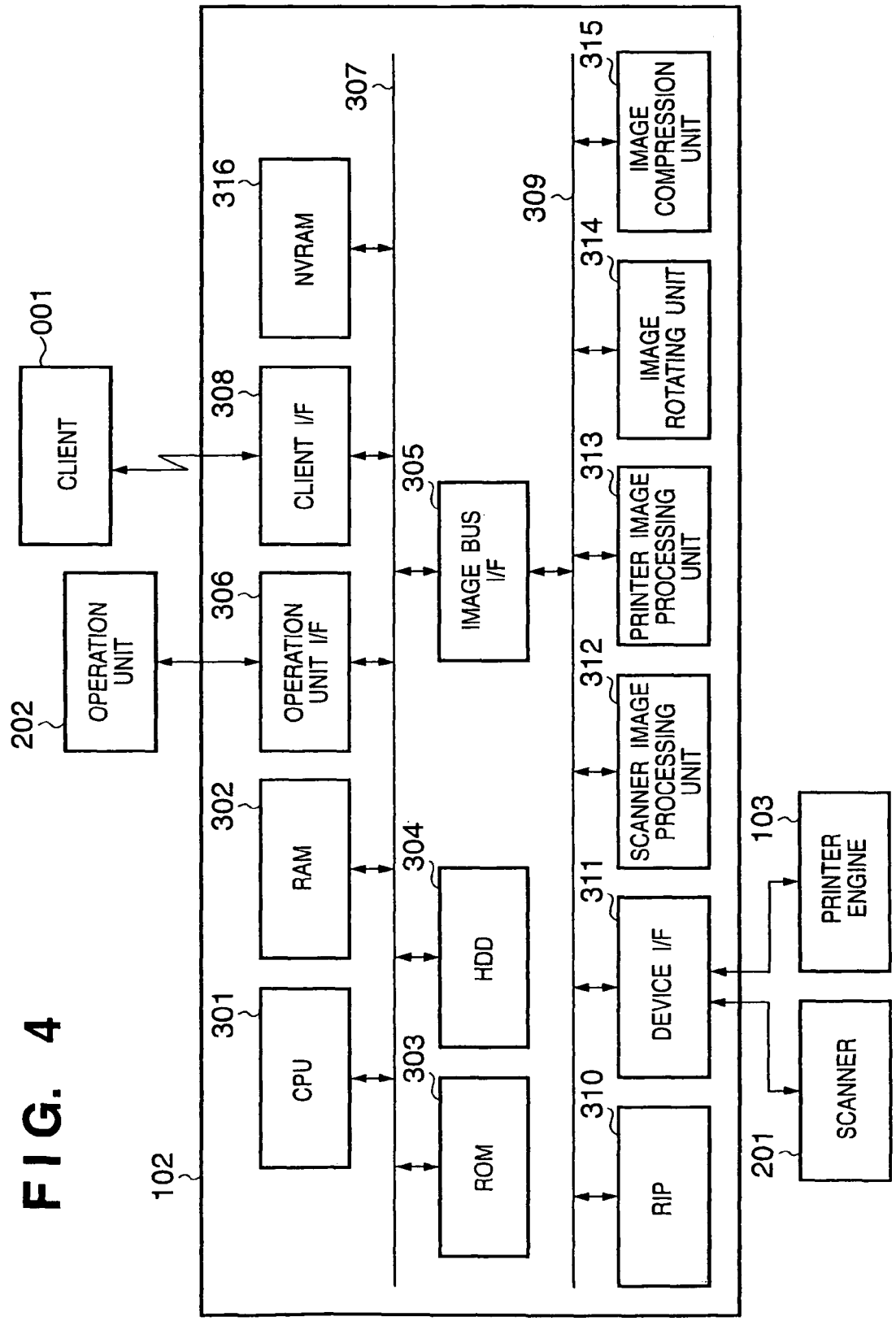
FIG. 4 is a block diagram showing the control configuration of the image forming apparatus.

FIG. 4 is a block diagram showing the control configuration of the image forming apparatus of this embodiment. A printer controller 102 is connected to the scanner 201 serving as an image input device and the printer engine 103 serving as an image output device. The printer controller 102 also transmits/receives print data, image information, and device information to/from each client through a client I/F 308.

A CPU 301 is a controller to control the entire system. A RAM 302 is a system work memory used by the CPU 301 to operate. The RAM 302 also serves as an image memory to temporarily store image data. A ROM 303 is a boot ROM which stores the boot program of the system. An HDD 304 is a hard disk drive to store system software and image data.

An operation unit I/F 306 is an interface to the operation unit (UI) 202 and outputs, to the operation unit 202, image data to be displayed on it. The operation unit I/F 306 also transmits information input by the user through the operation unit 202 to the CPU 301. Environment setting information such as an operation mode input from the operation unit 202 is stored in an NVRAM 316 serving as a nonvolatile memory.

The client I/F 308 transmits/receives information to/from each client. The above-described devices are arranged on a system bus 307.

An image bus I/F 305 serving as a bus bridge connects the system bus 307 to an image bus 309 which transfers image data at a high speed, and the image bus I/F 305 converts the data structure.

The following devices are arranged on the image bus 309. A raster image processor (RIP) 310 renders a PDL code transmitted from the network to a bitmap image. A device I/F unit 311 connects the scanner 201 and printer engine 103 serving as image input and output devices to the printer controller 102 to convert the synchronous and asynchronous systems of image data.

A scanner image processing unit 312 corrects, manipulates, or edits input image data. A printer image processing unit 313 executes printer correction or resolution conversion for print output image data. An image rotating unit 314 rotates image data. An image compression unit 315 executes JPEG compression/expansion processing for multilevel image data and JBIG, MMR, or MH compression/expansion processing for binary image data.

The image forming apparatus of this embodiment having the above arrangement is connected to each client (PC) through the client interface (e.g., intercommunicable network interface such as Ethernet) 308 and also operates as a host to execute load distributed processing by grid computing.

(Job Distributed Processing)

Job distributed processing of this embodiment will be described below with reference to flowcharts shown in FIGS. 5 to 8.

Figure 5:
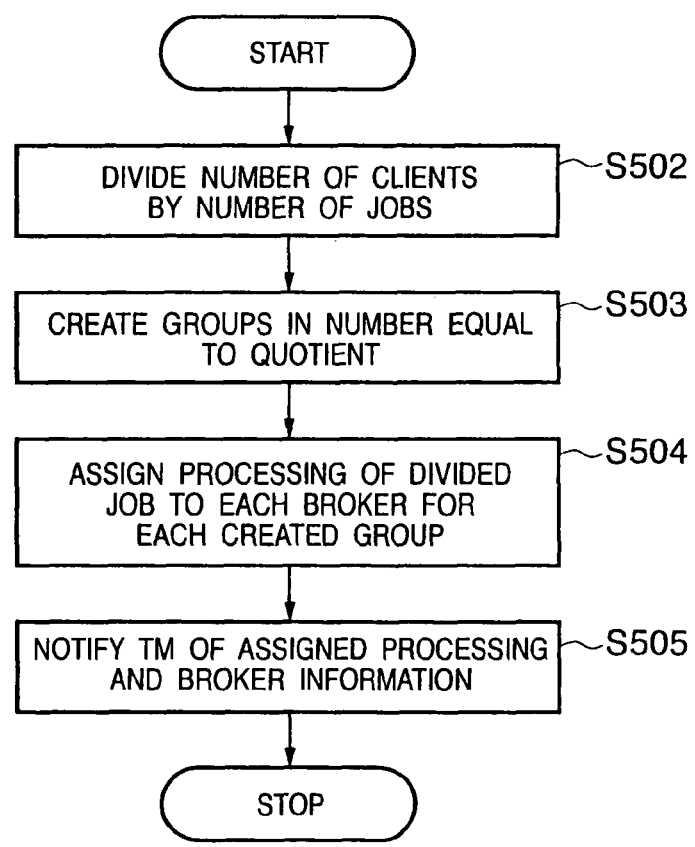
FIG. 5 is a flowchart of job assignment processing in a DJS according to the first embodiment.
Figure 6:
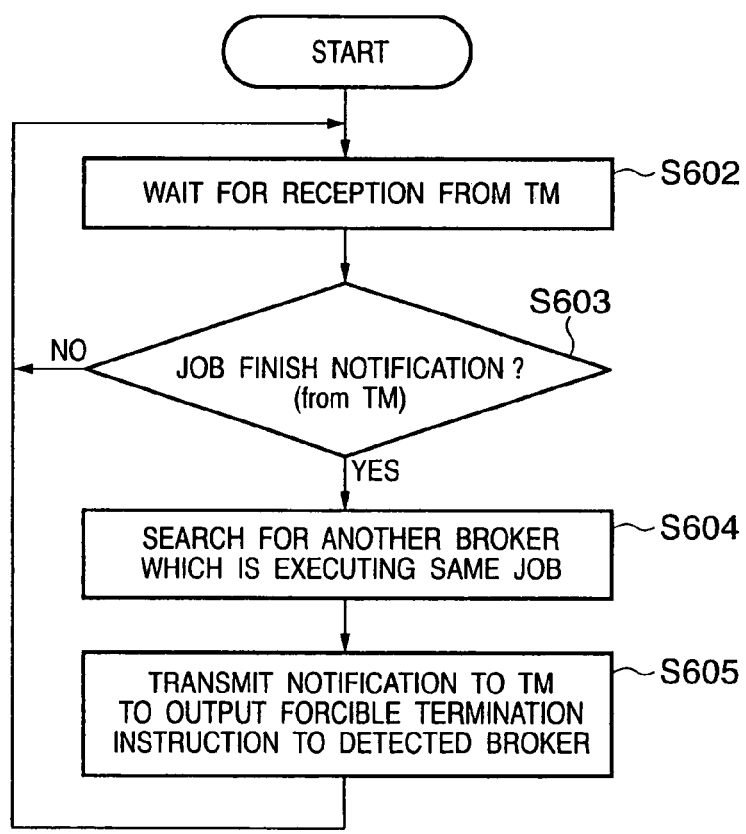
FIG. 6 is a flowchart showing processing of the DJS according to the first embodiment.
Figure 7:
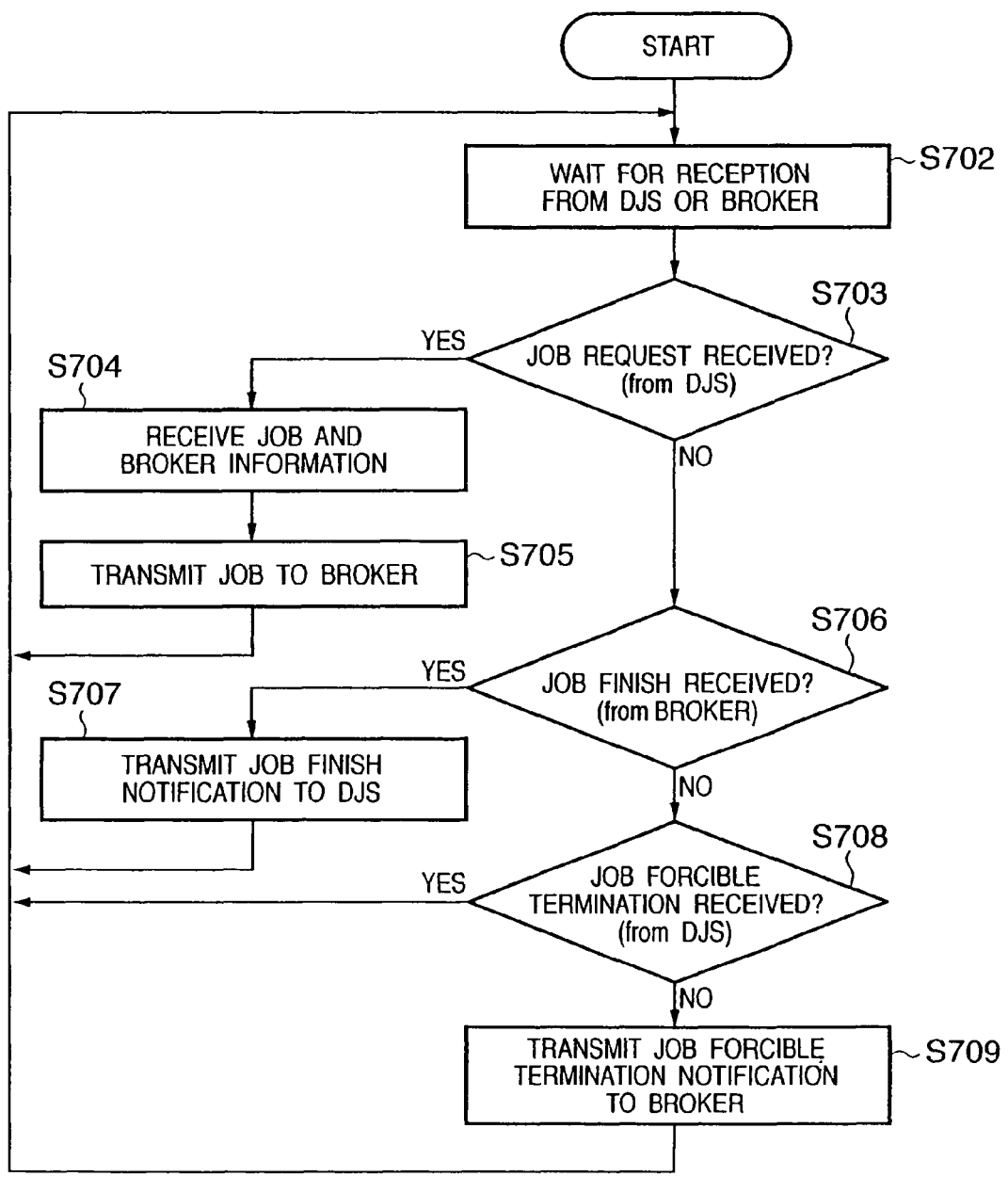
FIG. 7 is a flowchart showing processing of a TM according to the first embodiment.
Figure 8:
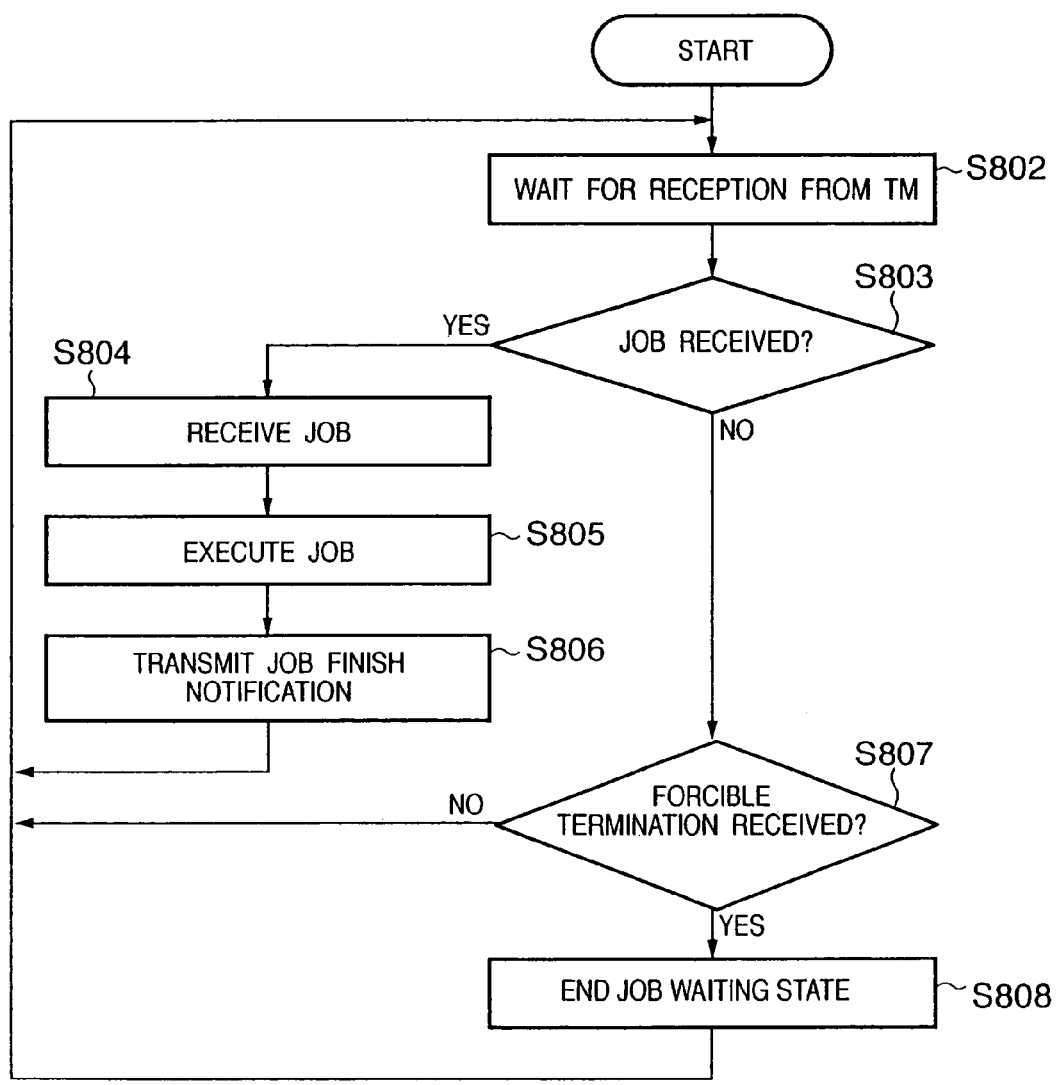
FIG. 8 is a flowchart showing processing of a broker according to the first embodiment.

FIG. 5 is a flowchart of job assignment processing in which a DJS groups the clients and instructs a broker to execute a job divided for each group. FIG. 6 is a flowchart of processing of causing the DJS to instruct forcible termination. FIG. 7 is a flowchart of processing of causing a TM to notify a broker of an instruction from the DJS and send a notification from the broker to the DJS. FIG. 8 is a flowchart showing processing of causing the broker to execute an instruction from the TM.

The flow of job assignment processing by the DJS will be described first with reference to FIG. 5. In this example, the number of clients to be subjected to distributed processing in grid computing is 20, and the number of divided jobs is 8.

When job assignment processing starts, in step S502, using the number of clients of the grid and the number of divided jobs, which are acquired in advance, the number of clients (20) is divided by the number of divided jobs (8). In step S503, groups in number corresponding to the quotient are created. In this example, the number of groups is 2. Each group only needs to include 8 or more clients. In step S504, the divided jobs are assigned to the two groups.

More specifically, in this example, the same job is assigned to one client in each group, i.e., two clients in total. Finally, in step S505, the correspondence between the broker of each client and the assigned divided job is transmitted to the TM, and the processing is finished.

The information representing the correspondence between the broker of each client and the assigned divided job is used in processing to be described later and is therefore held in the DJS itself in, e.g., a table format.

The operations of the DJS, TM, and broker during execution of the divided jobs will be described next with reference to FIGS. 6, 7, and 8.

In the DJS, the flow advances from step S505 to step S602 to wait for reception from the TM. When a notification is received from the TM, it is determined in step S603 whether a job finish notification is received. If NO in step S603, the flow returns to step S602 to set the reception wait state again. If a job finish notification (transmitted in step S707 to be described later) is received from the TM, the flow advances to step S604 to search for another broker (present in the other group) which is executing the same divided job on the basis of the information held by the DJS itself. In step S605, the DJS transmits a notification to the TM to output a divided job forcible termination instruction to the broker assigned the same job. Then, the reception wait state is set again.

In step S702, the TM waits for reception from the DJS or broker. Examples of notifications received by the TM are a notification transmitted from the DJS in step S605, a notification transmitted from the broker in step S806 to be described later, and a normal job request notification from the DJS.

In step S703, it is determined whether the received notification is a job request from the DJS. If YES in step S703, the flow advances to step S704 to receive the job and broker information. In step S705, a designated job is transmitted to a designated broker as a job request. The flow returns to step S702 to set the reception wait state again.

If NO in step S703, the flow advances to step S706 to determine whether the received notification is a job finish notification from a broker. If YES in step S706, the flow advances to step S707 to transmit the job finish notification to the DJS. The flow returns to step S702 to set the reception wait state again.

If NO in step S706, the flow advances to step S708 to determine whether the received notification is a divided job forcible termination notification from the DJS. If YES in step S708, the flow advances to step S709 to transmit the job forcible termination notification to the corresponding broker. The flow returns to step S702 to set the reception wait state again.

If NO in step S708, the flow returns to step S702 without executing any processing to set the reception wait state again.

In step S802, each broker waits for reception of the job request notification transmitted from the TM in step S705 or the job forcible termination notification transmitted in step S709. When a notification is received from the TM, the flow advances to step S803 to determine whether the notification is a job request.

If YES in step S803, the flow advances to step S804 to receive the contents (data and program) of the job to be executed. In step S805, the job is executed. After the job is finished, a job finish notification is transmitted to the TM in step S806. The flow returns to step S802 to set the reception wait state again.

If NO in step S803, the flow advances to step S807 to determine whether the notification received from the TM is a divided job forcible termination notification. If YES in step S807, the flow advances to step S808 to forcibly terminate the job currently being executed. The flow returns to step S802 to set the reception wait state again.

If NO in step S807, the flow returns to step S802 without executing any processing to set the reception wait state again.

The DJS, TM, and each broker operate in the above-described way. When a divided job is finished in one group, the same divided job which is being executed in the other group is forcibly terminated. The processing time of each divided job is that in the group which has finished the processing at the earliest timing. Hence, the time until all jobs are finished can be shortened.

Modification to First Embodiment

In the above-described first embodiment, no particular standard is used in grouping in step S503 of the flow shown in FIG. 5. Grouping may be done in accordance with the capability of each resource transmitted from the broker, such as the processing speed of the resource (CPU) of the client or the capacity of the memory. In this case, the time until the job is finished can be made shorter at a high probability by grouping clients with a high processing speed.

In the above embodiment, each divided job is used as the unit of forcible termination. In a large-scale system including an enormous number of clients, forcible termination may be executed not for each divided job but for each group which executes the whole job. In, this case, the number of free clients increases. It is effective when the number of requested jobs is large, or the job is often interrupted in each client by user operation.

Second Embodiment

An image forming system according to the second embodiment of the present invention will be described below. The image forming system of the second embodiment is similar to the first embodiment. A description of the same parts as in the first embodiment will be omitted, and characteristic parts of the second embodiment will mainly be described.

In the first embodiment, clients are grouped, and each group is instructed to execute divided jobs. In the second embodiment, so-called round robin assignment processing is executed in which divided jobs are assigned in turn to executable clients (brokers) so that the time until all jobs are finished can be shortened even when, e.g., the number of clients to be subjected to distributed processing is small.

Figure 9:
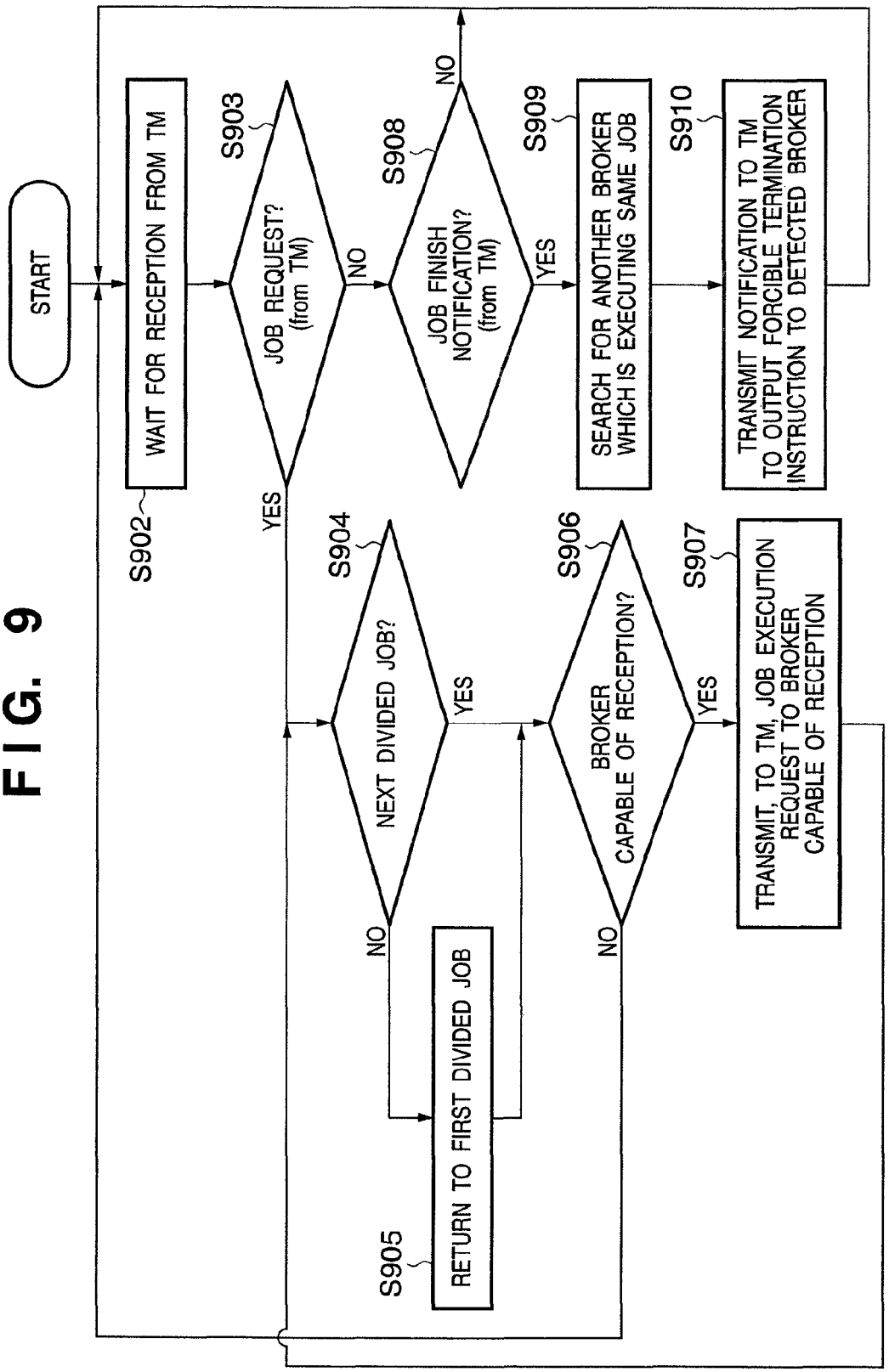
FIG. 9 is a flowchart showing processing of a DJS according to the second embodiment.

FIG. 9 is a flowchart showing processing of a DJS according to this embodiment. The processing shown in FIG. 5 to assign divided jobs to brokers and the operation shown in FIG. 6 after divided job assignment in the first embodiment are shown as one flowchart. The operations of the TM and broker after divided job assignment are the same as those shown in the flowcharts of FIGS. 7 and 8 described in the first embodiment.

In step S902, the DJS waits for reception from the TM. Upon receiving a notification from the TM, the flow advances to step S903 to determine whether the received notification is a job request. If YES in step S903, the flow advances to step S904. Otherwise, the flow advances to step S908.

In step S904, it is determined whether a divided job of the received job is present. If YES in step S904, the flow advances to step S906. If NO in step S904, the flow advances to step S905 to return the processing to the first divided job. Then, the flow advances to step S906.

In step S906, it is determined whether a broker capable of receiving the job is present. If YES in step S906, the flow advances to step S907 to notify the TM that it should request the broker to execute the job. The flow returns to step S904. As long as a broker capable of receiving the job is present, the processing in steps S904 to S907 is repeated. If NO in step S906, the flow returns to step S902.

If NO in step S903, the flow advances to step S908 to determine whether the received notification is a job forcible termination notification. If YES in step S908, the flow advances to step S909 to search for another broker which is executing the same job. In step S910, the DJS transmits a notification to the TM to output a divided job forcible termination instruction to the broker assigned the same job. Then, the flow returns to step S902 to set the reception wait state again. If NO in step S908, the flow returns to step S902 without executing any processing to set the reception wait state again.

An example of divided job assignment processing according to this embodiment will be described with reference to FIG. 10. In the illustrated example, the number of clients (brokers) to be subjected to distributed processing included in the image forming system is 14, and the number of divided jobs is 8.

Figure 10:
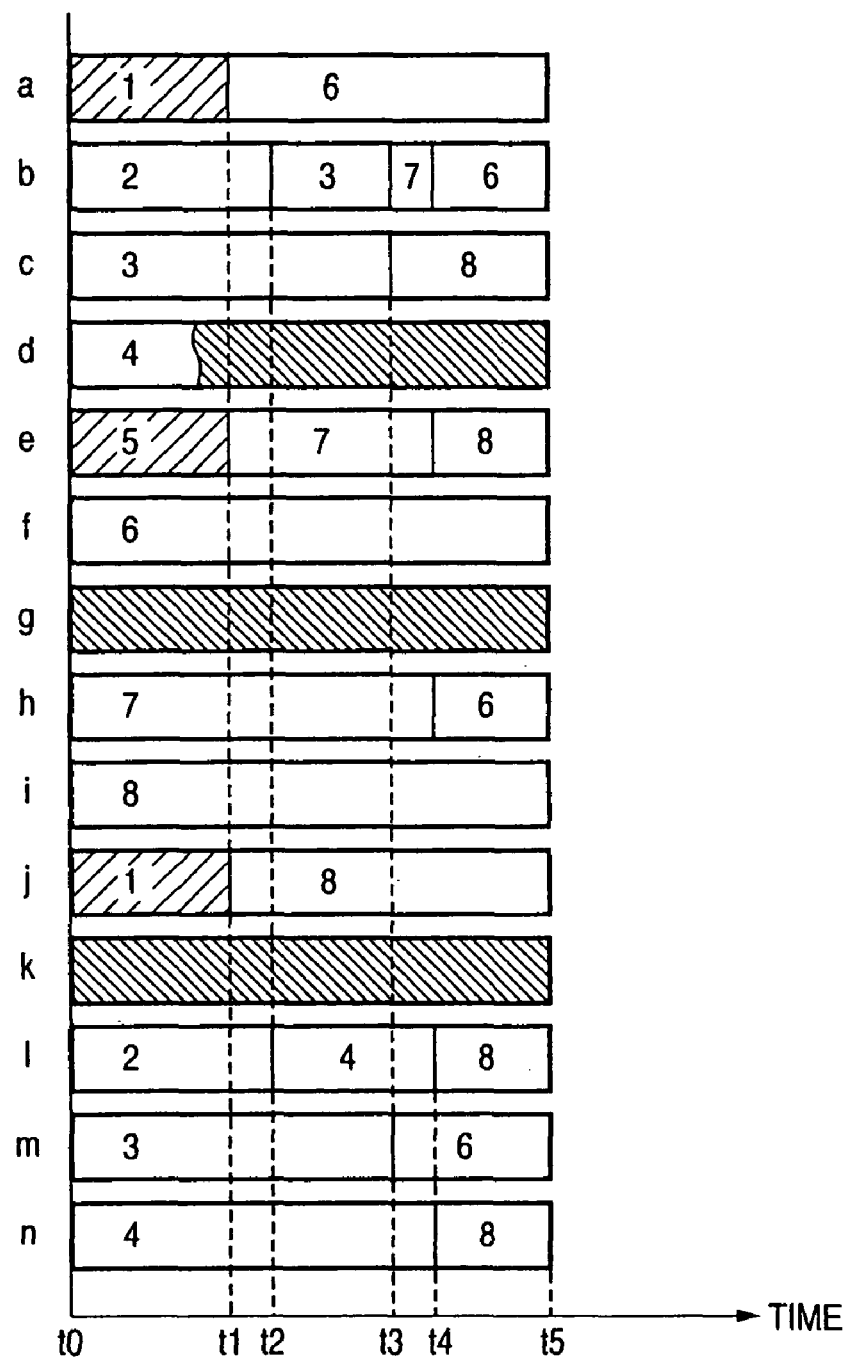
FIG. 10 is a view for explaining a detailed example of the second embodiment.

Referring to FIG. 10, a to n along the ordinate indicate the 14 different brokers. The frame next to each broker indicates processing contents in that broker. Each number in the frames indicates a divided job number. Hatching indicates a distributed processing disable state by a user interrupt.

At divided job assignment start time t0, the brokers g and k are not subjected to distributed processing by grid computing. For this reason, eight divided jobs 1 to 8 are assigned to 12 brokers, as shown in FIG. 10.

At time t1, of the eight divided jobs, job 1 and job 5 are finished. The three brokers a, e, and j which were executing jobs 1 and 5 are assigned unfinished jobs 6 to 8 next to job 5, respectively. At time t2, job 2 is finished. The brokers b and l which were executing job 2 are assigned unfinished jobs 3 and 4, respectively. At time t3, job 3 is finished. The brokers b and m which were executing job 3 are assigned jobs 6 and.7, respectively. At time t4, jobs 4 and 7 are finished. The brokers b, e, h, l, and n which were executing jobs 4 and 7 are assigned unfinished jobs 6 and 8. When jobs 6 and 8 are finished at time t5, all divided jobs are finished.

As described above, according to this embodiment, when the number of clients is not so large relative to the number of divided jobs, executable clients can effectively be used. Hence, the time until all jobs are finished can be shortened.

Third Embodiment

An image forming system according to the third embodiment of the present invention will be described below. The image forming system of the third embodiment is similar to the first and second embodiments. A description of the same parts as in the first and second embodiments will be omitted, and characteristic parts of the third embodiment will mainly be described.

In the first and second embodiments, no priority orders are given to the brokers in assigning the divided jobs. In the third embodiment, evaluation information based on a predetermined criterion is prepared for each broker. The pieces of evaluation information are held in a predetermined area of the DJS in, e.g., a table format. Divided jobs are assigned in an order according to the evaluation information of the brokers.

As the evaluation information, for example, a score is prepared for each broker. In step S604, the DJS increments the score of a broker from which a job finish notification is received. The DJS decrements the score of each broker which is executing the same job and should receive a forcible termination instruction in step S605 or S910. Divided jobs are preferably assigned to the brokers in descending order of scores.

In this case, a job is preferentially assigned to a broker which has normally finished jobs a number of times. Hence, divided job assignment to each broker is rationalized. As a result, the time until all lobs are finished can be shortened.

Modification to Third Embodiment

In the third embodiment, evaluation information (score) is incremented or decremented depending on whether a job is normally finished or forcibly terminated. Instead, the evaluation point may be changed on the basis of the capability of the resource (CPU, OS, or hardware resource) of each broker, time, location, department, user setting, processing time required for normal finish, or past record.

In place of evaluation information, log information of job execution by each broker (client) may be stored, and a broker to be assigned a job may be determined on the basis of the log information.

In the third embodiment, jobs are assigned in descending order of scores. Conversely, control may be done not to assign a job to a broker with a low score.

Other Embodiment

The present invention may be applied to a grid computing system (grid network) including a plurality of devices or a single device (host computer) included in a grid network.

The above-described embodiments may appropriately be combined as needed.

Furthermore, the invention can be implemented by supplying a software program, which implements the functions of the foregoing embodiments (program corresponds to flowcharts shown in FIGS. 5 to 9), directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-171768, filed Jun. 9, 2004, which is hereby incorporated by reference.

What is claimed is:

1. A job assignment method in an image forming apparatus having a job scheduler which divides an input job and determines a client apparatus to assign the divided job, and a task manager which transmits the divided job to the client apparatus determined by the job scheduler, said method comprising the steps of:

dividing the input job into the divided job, wherein the divided job is obtained by dividing the input job into a plurality of divided jobs;

causing the job scheduler to assign a same divided job of the plurality of divided jobs to a plurality of client apparatuses in a case where a number of client apparatuses is larger than a number of the plurality of divided jobs; and in a case where the job scheduler receives a finish notification for the same divided job from one of the plurality of client apparatuses assigned the same divided job, causing the job scheduler to instruct the task manager to issue a forcible termination instruction for the same divided job in the remaining client apparatuses, wherein the job scheduler prepares and holds a client score for each of the plurality of client apparatuses, by incrementing the client score for a client apparatus from which a divided job finish or normal finish notification has been received but decrementing the client score for a client apparatus to which a forcible termination instruction has been transmitted in response to the reception of the same divided job finish notification from another client apparatus, and changing the client score for a client apparatus based on the capability of the CPU or OS of the client apparatus or the processing time required for a normal finish by the client apparatus, wherein, in said step of causing the job scheduler to assign the same divided job to the plurality of client apparatuses, the job scheduler divides the plurality of client apparatuses into a plurality of groups based on processing speed of a CPU or capacity of a memory in each of the client apparatuses and determines the client apparatus to be assigned the divided job for each group, and wherein the job scheduler gives priority for assigning the divided job to a client apparatus that has a higher score than that of other client apparatuses among the plurality of client apparatuses, and wherein the job scheduler assigns the divided jobs to the plurality of client apparatuses in descending order of the held client scores for the plurality of client apparatuses.

2. The method according to claim 1, wherein the canceling step comprises a detection step of detecting whether all the divided jobs are finished in each group, and when it is detected in the detection step that all the divided jobs are finished in a group, execution of the job in the remaining groups is forcibly canceled.

3. The method according to claim 1, wherein the job scheduler assigns in turn the divided jobs to, of the plurality of client apparatuses, all client apparatuses capable of receiving the job.

4. The method according to claim 1, wherein the job scheduler comprises storage means for storing information about each client apparatus and determines an assignment order of the divided jobs on the basis of the information stored in the storage means.

5. The method according to claim 4, wherein the information contains one of information about performance of a resource of the client apparatus and information about an execution result of a job in the client apparatus.

6. The method according to claim 1, wherein at least one of the client apparatuses is an image forming apparatus.

7. A computer system, comprising:
a host computer and a plurality of client apparatuses connected through a network,
wherein each client apparatus includes a resource manager which manages a state of a resource of the apparatus, and a broker which communicates with the resource manager to receive information about the state of the resource, receives a job, and monitors a state of progress of the job, and
wherein the host computer includes a job scheduler which communicates with each broker to manage the state of the resource, divides an input job into a divided job, wherein the divided job is obtained by dividing the input job into a plurality of divided jobs, and determines the client apparatus to assign a same divided job of the plurality of divided jobs, and a task manager which transmits a request input by a user to the host computer to the job scheduler as the job and transmits the same divided job to the broker of the client apparatus determined by the job scheduler,
wherein the job scheduler comprises cancel means for, when the job scheduler receives a finish notification for the same divided job from one of the plurality of client apparatuses assigned the same divided job, causing the job scheduler to instruct the task manager to issue a forcible termination instruction for the same divided job in the remaining client apparatuses, and
wherein the job scheduler prepares and holds a client score for each of the plurality of client apparatuses, by incrementing the client score for a client apparatus from which a divided job finish or normal finish notification has been received but decrementing the client score for a client apparatus to which a forcible termination instruction has been transmitted in response to the reception of the same divided job finish notification from another client apparatus, and changing the client score for a client apparatus based on the capability of the CPU or OS of the client apparatus or the processing time required for a normal finish by the client apparatus, wherein the job scheduler assigns the same divided job to a plurality of client apparatuses when the number of client apparatuses is larger than the number of divided jobs, the job scheduler dividing the plurality of client apparatuses into a plurality of groups based on processing speed of a CPU or capacity of a memory in each of the client apparatuses, and determines the client apparatus to be assigned the divided job for each group, and
wherein the job scheduler gives priority for assigning the divided job to a client apparatus that has a higher score than that of other client apparatuses among the plurality of client apparatuses, and wherein the job scheduler assigns the divided jobs to the plurality of client apparatuses in descending order of the held client scores for the plurality of client apparatuses.

8. The system according to claim 7, wherein the cancel means comprises detection means for detecting whether all the divided jobs are finished in each group, and when the detection means detects that all the divided jobs are finished in a group, the cancel means forcibly cancels execution of the job in the remaining groups.

9. The system according to claim 7, wherein the job scheduler assigns in turn the divided jobs to, of the plurality of client apparatuses, all client apparatuses capable of receiving the job.

10. The system according to claim 7, wherein the job scheduler comprises storage means for storing information about each client apparatus and determines an assignment order of the divided jobs on the basis of the information stored in the storage means.

11. The system according to claim 10, wherein the information contains one of information about performance of a resource of the client apparatus and information about an execution result of a job in the client apparatus.

12. The system according to claim 7, wherein the host computer or at least one of the client apparatuses is an image forming apparatus.

13. An information processing apparatus which is connected to a plurality of client apparatuses through a network, each client apparatus including a resource manager which manages a state of a resource, and a broker which communicates with the resource manager to receive information about the state of the resource, receives a job, and monitors a state of progress of the job, said information processing apparatus comprising:
a job scheduler which communicates with each broker to manage the state of the resource, divides an input job into a divided job, wherein the divided job is obtained by dividing the input job into a plurality of divided jobs, and determines the client apparatus to assign a same divided job of the plurality of divided jobs; and
a task manager which transmits a request input by a user to the job scheduler as the job and transmits the divided job to the broker of the client apparatus determined by the job scheduler,
wherein the job scheduler comprises cancel means for, when the job scheduler receives a finish notification for the same divided job from one of the plurality of client apparatuses assigned the same divided job, causing the job scheduler to instruct the task manager to issue a forcible termination instruction for the same divided job in the remaining client apparatuses,
wherein the job scheduler prepares and holds a client score for each of the plurality of client apparatuses, by incrementing the client score for a client apparatus from which a divided job finish or normal finish notification has been received but decrementing the client score for a client apparatus to which a forcible termination instruction has been transmitted in response to the reception of the same divided job finish notification from another client apparatus, and changing the client score for a client apparatus based on the capability of the CPU or OS of the client apparatus or the processing time required for a normal finish by the client apparatus, wherein the job scheduler assigns the same divided job to a plurality of client apparatuses when the number of client apparatuses is larger than the number of divided jobs, the job scheduler dividing the plurality of client apparatuses into a plurality of groups based on processing speed of a CPU or capacity of a memory in each of the client apparatuses, and determines the client apparatus to be assigned the divided job for each group, and wherein the job scheduler gives priority for assigning the divided job to a client apparatus that has a higher score than that of other client apparatuses among the plurality of client apparatuses, and wherein the job scheduler assigns the divided jobs to the plurality of client apparatuses in descending order of the held client scores for the plurality of client apparatuses.

14. An image forming apparatus having a job scheduler which divides an input job and determines a client apparatus to be assigned the divided job, and a task manager which transmits the divided job to the client apparatus determined by the job scheduler, wherein the job scheduler comprises dividing means for dividing the input job into a divided job, wherein the divided job is obtained by dividing the input job into a plurality of divided jobs and determines the client apparatus to assign a same divided job of the plurality of divided jobs;

wherein the job scheduler comprises cancel means for, when the job scheduler receives a finish notification for the same divided job from one of the plurality of client apparatuses assigned the same divided job, causing the job scheduler to instruct the task manager to issue a forcible termination instruction for the same divided job in the remaining client apparatuses, and wherein the job scheduler prepares and holds a client score for each of the plurality of client apparatuses, by incrementing the client score for a client apparatus from which a divided job finish or normal finish notification has been received but decrementing the client score for a client apparatus to which a forcible termination instruction has been transmitted in response to the reception of the same divided job finish notification from another client apparatus, and changing the client score for a client apparatus based on the capability of the CPU or OS of the client apparatus or the processing time required for a normal finish by the client apparatus, wherein the job scheduler assigns the same divided job to a plurality of client apparatuses when the number of client apparatuses is larger than the number of divided jobs, the job scheduler dividing the plurality of client apparatuses into a plurality of groups based on processing speed of a CPU or capacity of a memory in each of the client apparatuses, and determines the client apparatus to be assigned the divided job for each group, and wherein the job scheduler gives priority for assigning the divided job to a client apparatus that has a higher score than that of other client apparatuses among the plurality of client apparatuses, and wherein the job scheduler assigns the divided jobs to the plurality of client apparatuses in descending order of the held client scores for the plurality of client apparatuses.

15. The apparatus according to claim 14, wherein said canceling means comprises detection means for detecting whether all the divided jobs are finished in each group, and when said detection means detects that all the divided jobs are finished in a group, forcibly cancels execution of the job in the remaining groups.

16. The method according to claim 14, wherein the job scheduler assigns in turn the divided jobs to, of the plurality of client apparatuses, all client apparatuses capable of receiving the job.

17. The apparatus according to claim 14, wherein the job scheduler comprises storage means for storing information about each client apparatus and determines an assignment order of the divided jobs on the basis of the information stored in the storage means.

18. The apparatus according to claim 17, wherein the information contains one of information about performance of a resource of the client apparatus and information about an execution result of a job in the client apparatus.

19. The apparatus according to claim 14, wherein at least one of the client apparatuses is an image forming apparatus.

* * * * *